Dec. 22, 1959 L. D. ÅBERG ET AL 2,918,235
PARACHUTE DEVICES
Filed Dec. 18, 1956 3 Sheets-Sheet 1
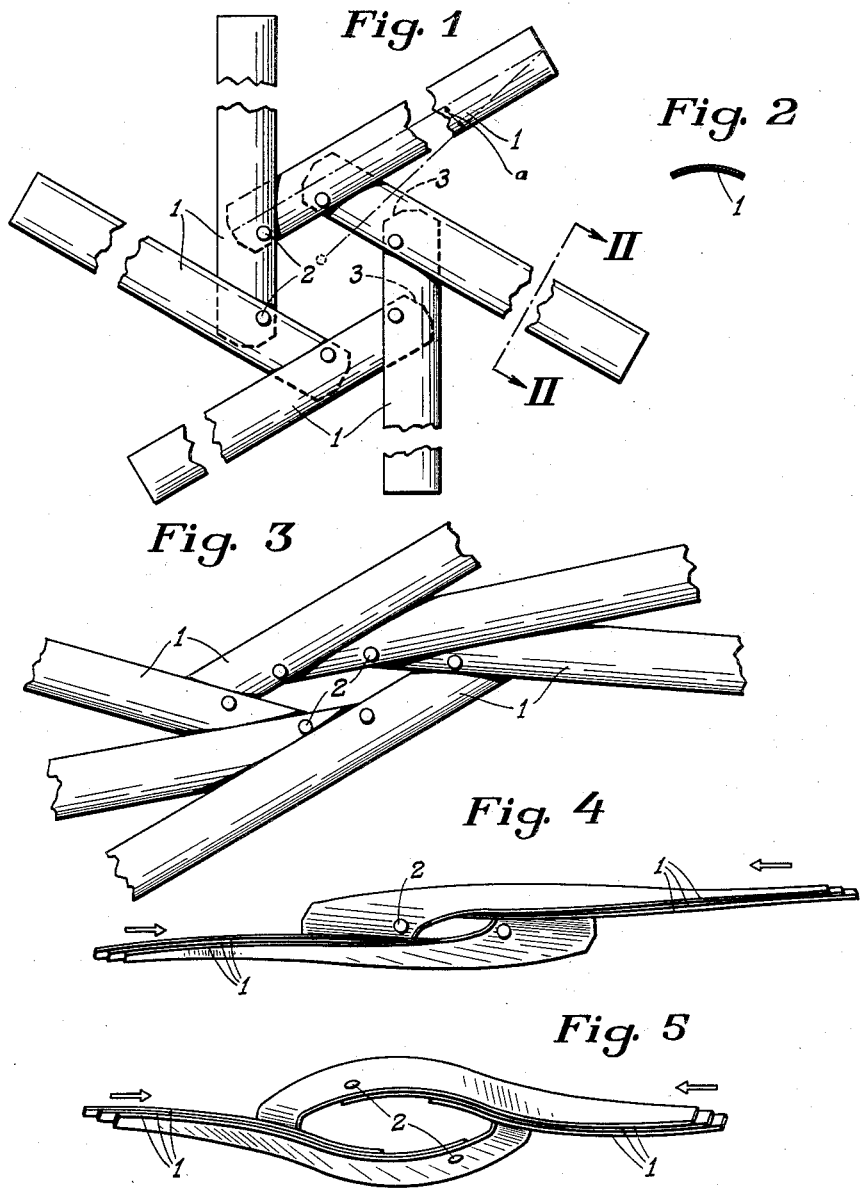
INVENTORS
LARS DOUGLAS ÅBERG,
CARL RUSTAN ÅBERG,
AND MANNE INGVAR WILSON
By Linton and Linton
ATTORNEYS Dec. 22, 1959   L. D. ÅBERG ET AL   2,918,235
PARACHUTE DEVICES Filed Dec. 18, 1956   3 Sheets-Sheet 2

INVENTORS
LARS DOUGLAS ÅBERG,
CARL RUSTAN ÅBERG,
AND MANNE INGVAR WILSON
By Linton and Linton
ATTORNEYS Dec. 22, 1959 L. D. ÅBERG ET AL 2,918,235
PARACHUTE DEVICES
Filed Dec. 18, 1956 3 Sheets-Sheet 3

INVENTORS
LARS DOUGLAS ÅBERG,
CARL RUSTAN ABERG,
AND MANNE INGVAR WILSON
By Linton and Linton
ATTORNEYS

United States Patent Office 2,918,235
Patented Dec. 22, 1959

2,918,235

PARACHUTE DEVICES

Lars Douglas Åberg and Carl Rustan Åberg, Goteborg, and Manne Ingvar Wilson, Norbyvallda, Sweden Application December 18, 1956, Serial No. 629,024

Claims priority, application Sweden December 31, 1955

4 Claims. (Cl. 244—138)

The present invention relates to a parachute device adapted to be expelled from a rocket or other launching device. More particularly the invention relates to such parachute devices as comprise a plurality of blades adapted to be moved to a folded position in the launching device and provided in such a manner that after launching the blades are swung out and caused to form a blade rotor adapted to serve as a parachute.

The principal object of the invention is to provide a parachute device of the aforementioned kind which will be simple in construction and suitable for large scale production.

Another object of the invention is to provide a parachute device of the aforementioned kind which when folded in the launching device will have small weight in relation to its lifting power.

Other objects of the invention are indicated by the following description with reference to the accompanying drawings showing some embodiments of the invention. In the drawings, Fig. 1 is a plan view of the parachute device in operative position, portions of the blades being cut away. Fig. 2 is a cross section of a blade taken on the line II—II of Fig. 1. Fig. 3 is a top partial view of the parachute device with the blades in their initial position for being rolled up.

Fig. 4 is a top view of the parachute device with the blades overlapping.

Fig. 5 is a top view of the blades as in Fig. 4 with the overlapping blades being moved in the direction of the arrows.

Figure 6:
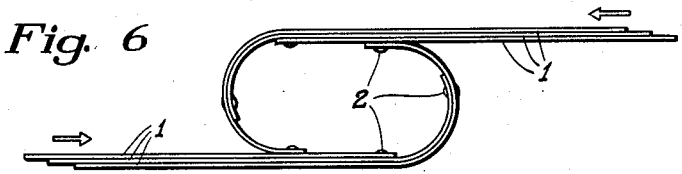
Figure 8:
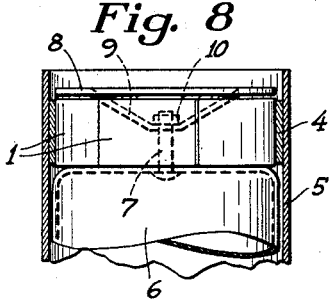
Figure 7:
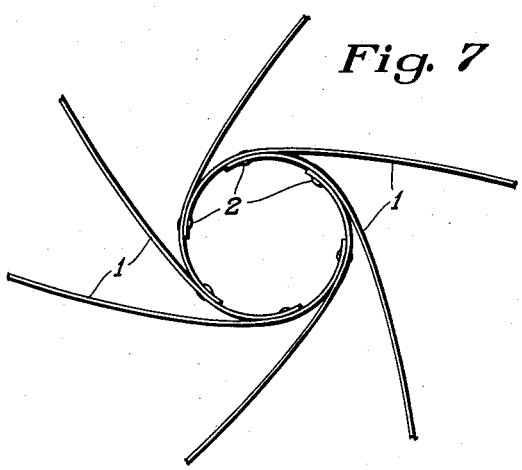

Fig. 6 is a further top view of the parachute device with the overlapping blades moved further than in Fig. 5 preparatory to being rolled for insertion in a rocket. Fig. 7 is a view showing the blade roller in its position when the blades are unrolled. Fig. 8 is a partial cross sectional view of the end portion of a rocket with the parachute device rolled up and mounted therein.

Figure 9:
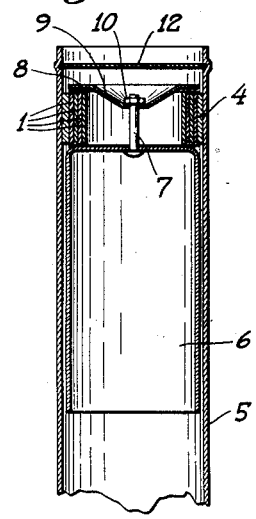

Fig. 9 is an axial section of a portion of a rocket with the parachute device mounted therein.

Figure 10:
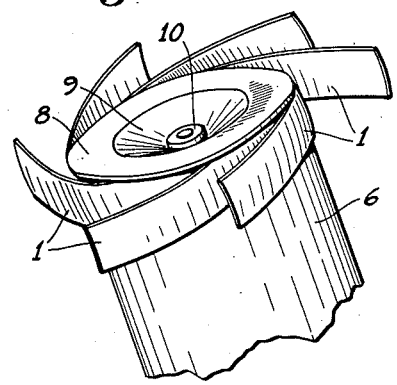

Fig. 10 is a perspective view of the parachute device in its initial unrolling position when ejected from a rocket and a portion of its attached casing.

Figure 11:
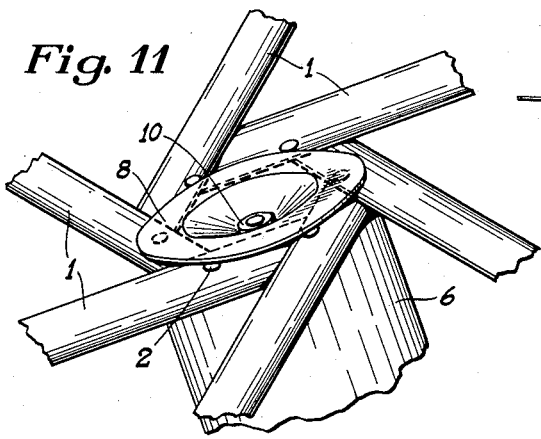
Figure 12:
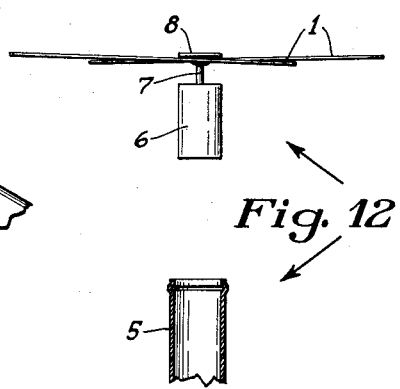
Figure 13:
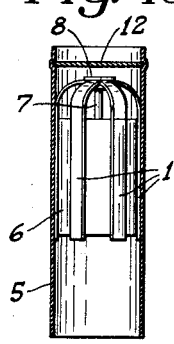
Figure 14:
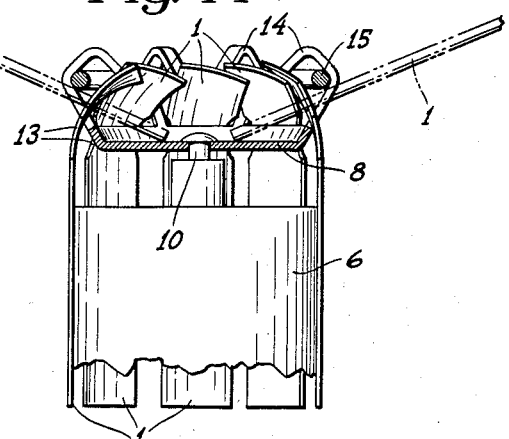
Figure 15:
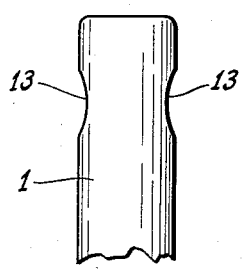

Fig. 11 is a perspective view of the parachute device in its fully unfolded position together with a partial view of its attached casing. Fig. 12 illustrates the action of the parachute device. Fig. 13 shows partially in section a second embodiment of the parachute device. Fig. 14 is a partial sectional view of a modified form of parachute device and its accompanying casing; and Fig. 15 is a partial plan view of the inner end of a blade forming part of said modification.

The parachute device according to the invention comprises a number of elastic or resilient blades of steel or other suitable metal or material and of extended form with the blades in their free state being substantially straight. In transverse direction they are curved as shown in Fig. 2 with the concave side of the blades in the operative position being turned downwards. By this form the thin steel blades, the thickness of which is exaggerated in the drawings, will have the rigidity required for operation as a parachute as they extend out in a radial plane from a vertical axis line and form a device similar to a blade rotor or autogyro, the longitudinal direction of each blade forming a small angle $a$ with a radius connecting the axis line of the rotor with the outer end of the blade. In the embodiment of Figs. 1 to 11, the inner ends of the blades are connected with each other by means of pivot pins 2 which are substantially vertical in the operative position of the device and are positioned laterally of the longitudinal center lines of the blades. The inner ends of the blades are chamfered as shown at 3. In a device of this kind the blades may be assembled in two groups which project substantially in diametrically opposite directions from the axis of the blade rotor. In the embodiment shown in Figs. 1 to 11 the device comprises six resilient blades which are adapted to be assembled in two groups having three blades in each group. The blades of each group are brought to a position in which they substantially cover each other, and in this position the two groups may be moved towards each other as indicated by the arrows of Figs. 4 and 5. Due to the fact that the pivot pins 2 are positioned laterally of the longitudinal center lines of the blades and the chamfered end edges 3 of the blades, the two groups of blades when moved together will gradually form a blade roller which in the beginning stage due to the compressing forces has an extended form as shown in Fig. 6 and gradually obtains a substantially cylindrical form as indicated in Fig. 7. This cylindrical roller is adapted to be moved axially into a sleeve 4 or the like which is divided axially into two halves or is provided with corresponding weak portions, and with the blade roller therein the sleeve is adapted to be inserted into the fore end portion of a tube or shell 5 of a launching device such as a rocket. In this shell behind the sleeve 4 enclosing the blade roller, a casing 6 enclosing an illuminating composition or any other useful load is fitted. From the center of the fore end wall of the casing 6 a pin 7 projects axially into the spring blade roller 1. In order to connect this roller with the fore end wall of the casing 6, a hub member in the form of a washer or plate 8 is provided covering the fore end of the blade roller and by a conical portion 9 extending into the opening of said roller, said portion by means of a nut 10 and a thread on the pin 7 or by other means is connected with said pin. In front of the plate 8 the rocket shell 5 is closed by a damming washer 12 as shown by Fig. 9. As generally known, note U.S. Patent No. 2,606,495 for example, the rocket shell 5 behind the casing 6 contains a propelling charge (not shown) and during the end stage of combustion of this charge of the rocket, the casing 6 and the blade roller 1 connected therewith and the sleeve 4 are expelled from the rocket shell 5, the parts of the sleeve 4 are thrown aside by the tensioned resilient blades 1, and by the mutual connection and arrangement of the resilient blades above described they will be immediately developed into the rotor form as illustrated by Figs. 9 and 10. The casing 6 containing or forming the carrier of the illuminating composition or flare or other load is now supported by the blade rotor forming the parachute device which checks the descent of said casing or carrier and its load.

The angle of attack, i.e. the angle between the cross-section of a blade and a plane perpendicular to the axis of rotation thereof, is generally about 6 degrees though in the use of the transversely curved blades this angle may be reduced down to 0 degrees because the curvature of the blade constitutes an angle of attack whereby the blade rotor in operation will rotate in the one or the other direction.

Transversely curved blades with a height of arc of about 10% of the width of the blade have proved to have about four times greater lifting force than plane blades. This form of the blades also will give thin blades the rigidity required when in operative or rotor position.

Practical tests in a wind tunnel have shown that a suitably constructed rotor of this kind will have greater lifting force than a parachute of the conventional type having the same diameter as the disc area of the rotor, but the present device assumes smaller space in the rocket, and the development of this device after expelling from the rocket will be more secure.

In the embodiment of Fig. 13, the parachute device in operative position has substantially the same form as described but the blades are at the center fixedly connected to each other or to a hub and not pivotally connected to each other. In inoperative position the blades are bent against their spring action in the same direction so that the outer portions thereof are substantially parallel and when inserted into the rocket shell 5 they are positioned on the outer side of the casing or carrier 6. When expelled from the rocket shell 5 they due to their spring action will spread to the rotor form, and the effect will be substantially the same as described with reference to the first embodiment.

The embodiment of Fig. 14 differs from that of Fig. 13 concerning the connection of the inner end portions of the blades 1 to the casing or carrier 6. As shown also by Fig. 15, the inner end portions of the blades are provided with recesses 13, and the edge of the hub plate 8 is provided with forwardly projecting fingers 14 the extreme ends of which are bent inwards and which are positioned at the same mutual distance. Inside these fingers a slotted resilient ring 15 is provided which ring springs outwardly, the blades 1 extending inside this ring and engaging by their recesses 13 with the fingers at opposite sides of each blade. In Fig. 14 the blades 1 are shown by full lines in a position before launching in which position the inner end portions of the blades are bent and these end portions are forced against the inwardly projecting ends of the fingers 14. After being expelled from the rocket, the blades by their resilient action will be moved to the position shown by dot and dashed lines in Fig. 14.

The invention is not restricted to the embodiments shown and described above. The number of the blades of said device may be any other than shown in the drawings. Also plane blades may be used, but transversely curved blades are generally preferred because they give the blades a certain rigidity enabling the use of thin and light steel or metal blades. The device according to the invention may also be used for other rocket loads such as, for instance, smoke generating compositions.

Parachute devices according to the present invention may also be used in connection with other expelling or launching devices than rockets, such as mortars.

What we claim is:

1. A parachute device comprising a plurality of resilient blades, said blades in their operative position forming a blade rotor, a carrier, said rotor being connected to said carrier for supporting a useful load therein, the blades of said rotor being capable of being folded around the axis of said rotor against the resilient action of said blades to an inoperative position with the blades forming a roller in this inoperative position, a shell having said carrier and roller therein, and said carrier and roller adapted to be expelled from said shell enabling the blades to be swung out by their resilient action to the operative position in which said blades form said rotor and means in said shell for expelling said carrier and roller therefrom.

2. A parachute device comprising a plurality of resilient blades, said blades in their operative position forming a blade rotor, a casing containing a useful load, said rotor being mounted on said casing and adapted to be folded around the axis of said rotor against the resilient action in said blades to an inoperative position with said blades forming a roller in this inoperative position, a shell having said casing with useful load and blade roller therein, and means for expelling the casing with useful load and blades from said shell whereby the blades are swung out by their own resilient ability to the operative position in which they form said blade rotor.

3. A parachute device comprising a plurality of resilient blades with a curved cross-section, said blades in the operative position forming a blade rotor, a casing, said rotor being mounted on said casing and adapted to be folded against their resilient action around the axis of said rotor to an inoperative position with said blades forming a roller in this inoperative position, a shell having said casing and roller therein, said roller being adapted to be expelled from said shell whereby the blades are swung out by their own resilient ability to operative position in which they form said blade rotor and means in said shell for expelling said roller therefrom.

4. A parachute device comprising a plurality of resilient blades with a curved cross-section, said blades in their operative position forming a blade rotor, a substantially cylindrical casing for a useful load, said rotor being mounted in said casing, said blades being capable of being bent around the axis of said rotor against their resilient action to an inoperative position with said blades forming in this position a blade roller disposed adjacent to one end of said cylindrical casing, a shell having said casing with useful load and roller therein, and means for expelling said casing with useful load and roller from said shell whereby said blades are swung out by their own resilient ability to their operative position in which they form said blade rotor.

References Cited in the file of this patent

UNITED STATES PATENTS

| | | |
|---|---|---|
| 1,964,016 | Wiley | June 26, 1934 |
| 2,606,495 | Clauser et al. | Aug. 12, 1952 |
| 2,614,636 | Prewitt | Oct. 21, 1952 |
| 2,654,320 | Schmid | Oct. 6, 1953 |
| 2,671,398 | Peck | Mar. 9, 1954 |

FOREIGN PATENTS

| | | |
|---|---|---|
| 745,252 | Great Britain | Feb. 22, 1956 |